No. 632,290. Patented Sept. 5, 1899.
J. P. TURNER.
CLAW BAR.
(Application filed Oct. 20, 1898.)
(No Model.)
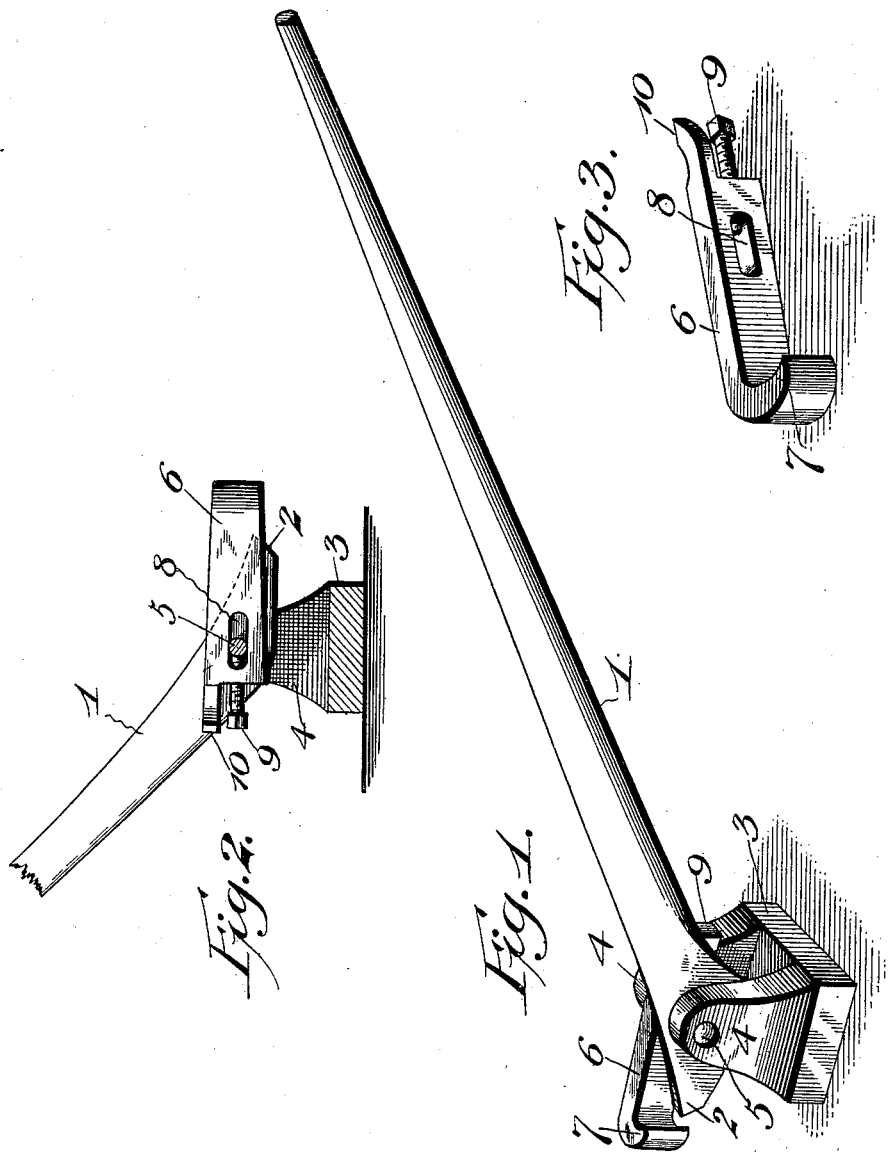
Witnesses
Joseph P. Turner, Inventor.
By his Attorneys,

UNITED STATES PATENT OFFICE.

JOSEPH P. TURNER, OF REIDSVILLE, NORTH CAROLINA, ASSIGNOR OF THREE-FOURTHS TO GEORGE W. ELLINGTON, JOSEPH S. WIMBISH, AND JOHN W. MOBLEY, OF SAME PLACE.

CLAW-BAR.

SPECIFICATION forming part of Letters Patent No. 632,290, dated September 5, 1899.

Application filed October 20, 1898. Serial No. 694,137. (No model.)

*To all whom it may concern:*

Be it known that I, JOSEPH P. TURNER, a citizen of the United States, residing at Reidsville, in the county of Rockingham and State of North Carolina, have invented a new and useful Claw-Bar, of which the following is a specification.

This invention relates to claw-bars; and the object thereof is to provide the claw with an adjustable dog to assist the gripping action and to accommodate the device to the varying sizes of nails, spikes, and bolts.

Further objects and advantages of the invention will be hereinafter more fully described, shown in the accompanying drawings, and particularly pointed out in the claims.

In the drawings, Figure 1 is a perspective view of the device. Fig. 2 is a side elevation, parts being broken away to disclose the adjusting-slot of the dog. Fig. 3 is a detail perspective view of the dog.

Similar numerals of reference indicate corresponding parts in all the figures of the drawings.

Referring to the drawings, 1 designates a lever having the claw 2 at one end. This claw is mounted upon a base or fulcrum block 3 between two bearing-ears 4, formed integral with the block. A loose pin 5 extends through the ears and the claw, forming the pivot and fulcrum point of the claw-bar. The distance between the ears 4 is greater than the width of the claw in order to accommodate the dog 6 between the claw and one of the bearing-ears. The forward end of this dog is hooked or laterally bent, as shown at 7, and the hooked portion extends transversely across and beyond the end of the claw 2. A longitudinal slot 8 is formed in the body of the dog, and a set-screw 9 extends through the rear end of the dog into the slot 8 and is adapted to engage the loose pin 5, whereby the dog may be adjusted longitudinally to fit the device to the different sizes of bolts and the like, and the dog is loosely pivoted to one side only of the bar. To facilitate the adjustment of the dog, a thumb-piece 10 is provided at the rear thereof just above the adjusting set-screw.

The base-block 3 may be dispensed with without affecting the nature of the invention, as the claw will work effectively without this block.

In operating the device the block 3 is placed squarely in position adjacent to the bolt or the like to be extracted, with the end of the claw against one side of the bolt. The dog is then adjusted so as to engage the hooked end thereof around the opposite side of the bolt, and then the lever is pressed downward and the bolt is tightly gripped between the end of the claw and the hooked end of the dog, and by further depressing the lever the bolt will be effectively drawn.

By reason of the dog being loosely pivoted to one side of the bar the device may be applied laterally to a nail or spike, receiving the latter transversely between the end of the claw 2 and the hook 7 from the side opposite the dog. Thus the implement may be applied to a nail or spike without lifting the dog to pass it over the head of the nail or spike.

The present invention provides an exceedingly simple and useful device, in which changes in the form, proportion, and minor details may be made without departing from the spirit and scope or sacrificing any of the advantages thereof, and therefore I do not wish to be understood as limiting myself to the precise construction and arrangement as herein set forth.

Having thus described the invention, what is claimed is—

1. A claw-bar, provided with a dog having a longitudinal slot formed therein, and an adjusting-screw entering said slot, the dog being pivoted to the claw through the slot in the dog, substantially as shown and described.

2. A claw-bar, having a dog which is pivoted to the claw and provided with a longitudinal adjustment thereon, and a thumb-piece for adjusting the dog, substantially as shown and described.

3. A claw-bar, comprising a base-block having spaced bearing-ears between which the claw is pivoted, and a dog pivoted between one side of the claw and one of the bearing-ears by means of the same pivot-pin for the claw, substantially as shown and described.

In testimony that I claim the foregoing as my own I have hereto affixed my signature in the presence of two witnesses.

JOSEPH P. TURNER.

Witnesses:
A. S. PRICE,
E. S. BLACKWELL.